(12) United States Patent
Savioz

(10) Patent No.: US 10,966,566 B2
(45) Date of Patent: Apr. 6, 2021

(54) FOAMING DEVICE

(71) Applicant: NESTEC S.A., Vevey (CH)

(72) Inventor: Gregory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 245 days.

(21) Appl. No.: 15/775,529

(22) PCT Filed: Nov. 11, 2016

(86) PCT No.: PCT/EP2016/077513
§ 371 (c)(1),
(2) Date: May 11, 2018

(87) PCT Pub. No.: WO2017/081308
PCT Pub. Date: May 18, 2017

(65) Prior Publication Data
US 2018/0360259 A1 Dec. 20, 2018

(30) Foreign Application Priority Data
Nov. 13, 2015 (EP) .................................. 15194580

(51) Int. Cl.
A47J 31/44 (2006.01)
B01F 3/04 (2006.01)
A01J 11/04 (2006.01)
A23C 7/00 (2006.01)

(52) U.S. Cl.
CPC ....... *A47J 31/4496* (2013.01); *A47J 31/4485* (2013.01); *B01F 3/04453* (2013.01); *A01J 11/04* (2013.01); *A23C 7/00* (2013.01); *B01F 2215/0006* (2013.01)

(58) Field of Classification Search
CPC .... A47J 31/4496; A47J 31/4485; A01J 11/04; B01F 3/04453; B01F 2215/0006; A23C 7/00
See application file for complete search history.

(56) References Cited

U.S. PATENT DOCUMENTS

| 8,678,244 B2* | 3/2014 | Yang | B05B 9/0866 222/333 |
| 2007/0272317 A1* | 11/2007 | Klopfenstein | B67D 1/0046 137/889 |
| 2008/0203591 A1* | 8/2008 | Pelfrey | A47K 5/16 261/28 |

(Continued)

FOREIGN PATENT DOCUMENTS

| CN | 201243958 Y | 5/2009 |
| CN | 101600378 A | 12/2009 |

(Continued)

*Primary Examiner* — Stephen Hobson
(74) *Attorney, Agent, or Firm* — K&L Gates LLP

(57) ABSTRACT

Pumping and foaming device (100) comprising a pumping and foaming unit (102) rotatable around a shaft (130) by driving means (104), the pumping and foaming unit (102) comprising a pumping element (110) whose rotation pumps both air and fluid and mixes them; the pumping and foaming unit (102) further comprising a foaming element (120) whose relative rotation in a foaming chamber (121) drives the mixture of air and fluid coming from the pumping element (110) under a certain level of shear stress which allows this mixture to be foamed.

10 Claims, 5 Drawing Sheets

(56) References Cited

U.S. PATENT DOCUMENTS

| | | | | |
|---|---|---|---|---|
| 2008/0277421 A1* | 11/2008 | Zlatic | A47K 5/16 | |
| | | | 222/136 | |
| 2011/0143006 A1* | 6/2011 | Douma | A47J 43/121 | |
| | | | 426/474 | |
| 2012/0285992 A1* | 11/2012 | Ciavarella | A47K 5/16 | |
| | | | 222/138 | |
| 2015/0305549 A1* | 10/2015 | Perentes | A47J 31/4496 | |
| | | | 426/474 | |
| 2016/0135474 A1* | 5/2016 | Vetterli | B01F 3/04446 | |
| | | | 426/474 | |
| 2017/0127875 A1* | 5/2017 | Savioz | A47J 31/4485 | |
| 2017/0303732 A1* | 10/2017 | Balkau | A47J 31/4489 | |
| 2017/0303733 A1* | 10/2017 | Balkau | A47J 31/469 | |
| 2017/0303734 A1* | 10/2017 | Balkau | A47J 31/4489 | |
| 2017/0303735 A1* | 10/2017 | Balkau | A47J 31/4485 | |
| 2018/0237283 A1* | 8/2018 | Savioz | A47J 31/4485 | |
| 2018/0325306 A1* | 11/2018 | Mathure | A47J 31/4403 | |
| 2018/0368611 A1* | 12/2018 | Savioz | A47J 31/4485 | |
| 2019/0053660 A1* | 2/2019 | Kroos | A47J 31/469 | |

FOREIGN PATENT DOCUMENTS

| | | |
|---|---|---|
| CN | 201920509 U | 8/2011 |
| WO | 2015197509 | 12/2015 |

* cited by examiner

FOAMING DEVICE

CROSS REFERENCE TO RELATED APPLICATIONS

The present application is a National Stage of International Application No. PCT/EP2016/077513, filed on Nov. 11, 2016, which claims priority to European Patent Application No. 15194580.5, filed on Nov. 13, 2015, the entire contents of which are being incorporated herein by reference.

FIELD OF THE INVENTION

The present invention is directed to a foaming device for pumping and foaming a fluid or a food product, which can be optionally heated. In particular, the invention is directed to a foaming device, particularly to a pumping and foaming device, producing very high quality fluid foam on demand, having a simple architecture and being easily cleanable.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

It is desirable to produce food foams obtained from food fluid products with the tiny and stable air bubbles to provide a light texture and different mouth feel. In most of the food foams, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, it would be desirable to produce foam on demand, having a superior quality. Moreover, it would be desirable to provide this prime quality foam as quickly as possible and in a repeatable way, meaning that the foam quality is controlled and can be repeated from one fluid to another.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Also, in order to regulate the characteristics of the foam obtained, the geometry of the whisk needs to be controlled, something which is hard to understand and control in a precise way, making any repeatability of the process too complex and not achievable.

Document EP 2478804 A1 in the state of the art, for example, discloses a milk reservoir pressurized by gas, the pressurized milk being directed to a mixing area for being further mixed with another gas. Later frothing and reduction of the size of bubbles occurs in a frothing arrangement, comprising typically a static mixer or a rotating whisk. However, the regulation and control of the foaming in such systems is complicated and not precise, also requiring a complex configuration. Moreover, these systems require cleaning after foaming has been produced, which is both cumbersome and time consuming.

Other documents known in the state of the art, such as US 2013/0043274 A1, describe packaging solutions providing storing, dosing and dispensing functions particularly adapted for food fluid products, typically beverages, comprising a container, dosing means and a valve. The dosing means comprise a rotor with at least a truncated part driven in rotation and working as a dosing device, taking liquid from a dosing inlet and driving it to a dosing outlet, such that the liquid from the container is conveyed into a mixing chamber where it is mixed with a diluent: when this diluent is gas ($N_2$ or $CO_2$) a head of foam is provided on the upper layer of the beverage. However, the foaming process in this system is not produced in a controlled and precise way, being very difficult to monitor and to regulate it and, consequently, to obtain repeatable results from one fluid foamed to another.

Accordingly, other solutions have been provided to allow the production of foaming fluids in a controlled and regulated manner. An example is provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. With this solution, milk foam can be produced in a controlled way. However, the device is relatively complex and requires frequent cleaning after milk foam has been produced, something which is time consuming and not attractive for the user.

There are also well known foaming devices in the state of the art which use steam to foam via a Venturi effect, such as for example the devices shown in EP 2695556 A1 or in EP 2636343 A1. Document EP 2695556 A1 discloses a device for preparing heated milk foam having a suction device comprising a mixing chamber with vapour and milk, such that this mixture is suctioned through utilizing Venturi effect, so that milk foam is provided. Another example is provided in document EP 2636343 A1, where a device for producing heated milk foam is described: this device uses a narrowing nozzle, particularly a Venturi nozzle, for obtaining a suction effect of milk and vapour, in order to produce milk foam. However, these known systems using the Venturi effect are not operated in a clean way, the milk being repeatedly in contact with the device which not only imposes often cleaning but which can also be a source of product contamination. Moreover, these devices only allow the production of hot milk foam: cold milk foam is not an option when using such systems. Apart from this, the quality of the foam obtained by using these systems is not satisfying.

On top of that, these systems are typically prepared to allow only the production of milk foam, but not the production and delivery of other types of food foams, such as for example foams from vegetables or other food products, which are more viscous and cannot be processed in standard known foaming devices.

Therefore, there is still a need to provide a simple device which is able to produce high quality foam on demand, in a short time, in a reliable and repeatable way. Moreover, this device will be able to provide other types of food foams, such as for example foams from vegetables. The present invention aims at providing a foaming device which addresses these and other needs.

SUMMARY OF THE INVENTION

According to a first aspect, the invention relates to a pumping and foaming device comprising a pumping and foaming unit rotatable around a shaft by driving means, the pumping and foaming unit comprising a pumping element whose rotation pumps both air and fluid and mixes them; the pumping and foaming unit further comprising a foaming element whose relative rotation in a foaming chamber drives the mixture of air and fluid coming from the pumping element under a certain level of shear stress which allows this mixture to be foamed.

Preferably, the pumping element is configured as gears where the module and/or number and/or height of the teeth configuring these gears, and the shape and/or size of the foaming element are calculated so as to have a specific balance between the pumping performance and the foaming capability, respectively, provided by the device.

Typically, the foaming element comprises a rotatable element with respect to a stationary part in the foaming chamber defining a gap where the mixture of air and fluid is driver under shear stress to be foamed.

Preferably, the gap in the foaming chamber is comprised between 0.2 and 1 mm, preferably between 0.3 and 0.6 mm.

In the pumping and foaming device of the invention, the pumping and foaming unit is typically driven by a motor, such that the pumping element and the foaming element rotate around the shaft at a speed comprised between 2000 and 10000 rpm, preferably between 4000 and 8000 rpm.

Preferably, the fluid is a foamable fluid or a foamable food, such as vegetable foam, liquid purée, sauce, among others.

According to the invention, the foaming element is typically configured as a cylinder, as a cone or as a disc.

The foaming element in the pumping and foaming device of the invention preferably further comprises at least one propelling element on at least one of its surfaces intended to direct the fluid towards the foaming chamber where the fluid is subjected to shear stress.

The pumping and foaming device typically further comprises a heating unit allowing heating the foam from the pumping and foaming unit before it is delivered.

Preferably, the pumping and foaming device of the invention is configured to be deployable allowing an easy cleaning of the parts in contact with the fluid. Typically, it further comprises a container and/or a cartridge through which fluid is pumped and an air entry through which air is pumped to mix with the fluid.

Preferably, the pumping and foaming device further comprises a back-pumping valve connected to the air inlet in the device preventing any back-pumping of fluid.

According to a second aspect, the invention relates to a system for providing a fluid foam on demand comprising a pumping and foaming device as the one described, further comprising driving means driving in rotation the pumping and foaming unit and an external air inlet through which air enters the device.

Typically, the system comprises an adjustable valve regulating the amount of air entering the device.

Preferably, the system further comprises a heat source able to heat the foam coming from the pumping and foaming unit before it is delivered.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

The present invention is directed to a foaming device 100 for pumping and foaming a fluid or a food product, producing very high quality fluid foam on demand, having a simple architecture and being easily cleanable, as it will be understood from the rest of the description that follows.

Figure 1A:
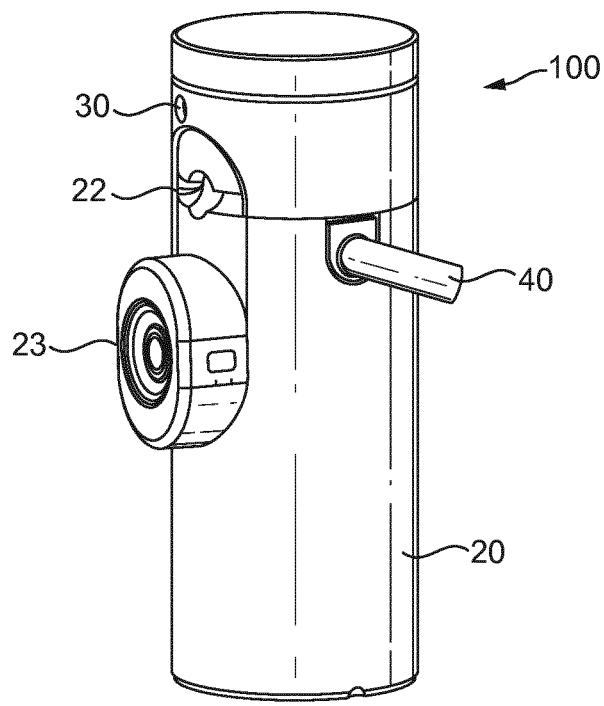
FIGS. 1a-b show schematic views of a pumping and foaming device according to a first preferred embodiment of the present invention.
Figure 1B:
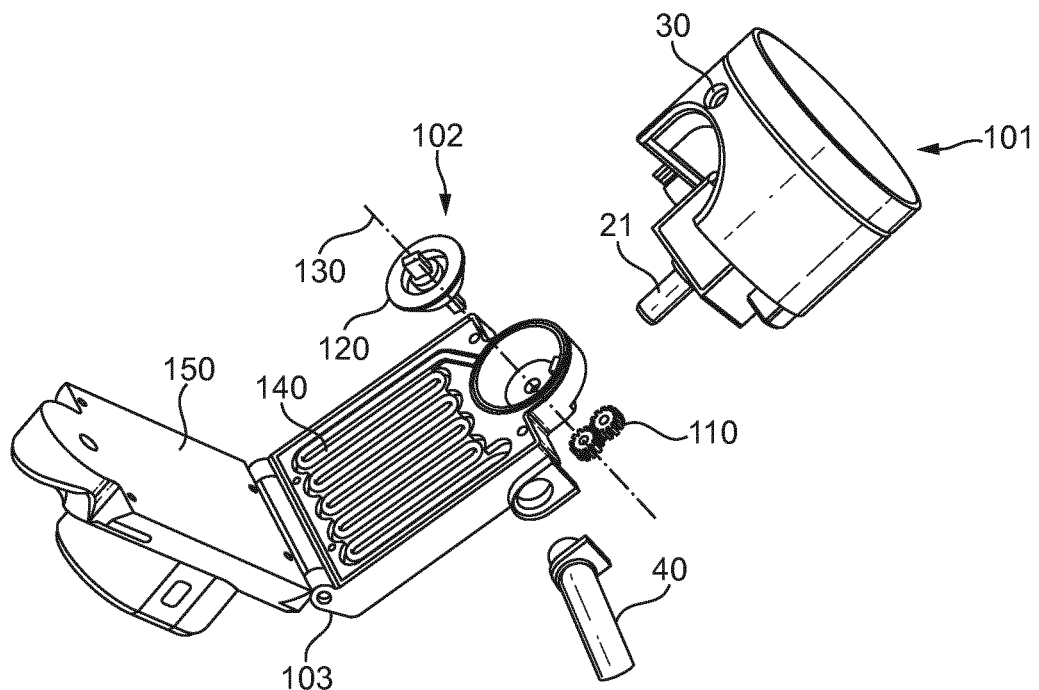

As represented in any of FIGS. 1a-b, the foaming device 100 of the invention, according to a first preferred embodiment, comprises a mixing unit 101 where a foamable fluid or a foamable food product is pre-mixed together with air, in order to prepare a mixture that will be later foamed: we speak about pre-mixing as the fluid is entrained together with air bubbles when brought together by confluence of the air and fluid sucked in the so called mixing unit 101; however, it is when that pre-mixture is entrained through the pumping element 110 and when it is further foamed in the foaming unit 102 when the air bubbles are made much smaller and a more intimate and complete mixing of the air and the fluid is finally achieved. The device 100 further comprises a pumping and foaming unit 102, driven by a single driving means 104, typically an electrical motor, and providing a double function: on one side, the unit 102 is able to pump/suck both air and fluid or food product and, on the other side, it foams it. The pumping and foaming device 100 of the invention further comprises a heating unit 103 which can optionally heat the foam before it is delivered through a foam outlet 40. As represented in FIG. 1a, the device 100 comprises a container 20 where the fluid or food product is stored, until it is pumped/sucked by the pumping and foaming unit 102. As represented in this FIG. 1a, the device 100 comprises an air entry 30 through which air is pumped/sucked by the pumping and foaming unit 102 into the mixing unit 101, so that a mixture of fluid (or food product) and air is produced. The fluid or food product is introduced in the mixing unit 101 by a fluid inlet 21, typically configured as a pipe connecting the container 20 with the mixing unit 101. As shown in FIG. 1a or 1b, the foam outlet 40 is configured as a pipe or conduct that can be easily detached from the rest of the device 100 to allow its easy cleaning.

FIG. 1a also shows the electrical connection 23 for the heating means 103, typically a connection of 230V for an electrical heating insert. The mechanical connection 22 is also represented in FIG. 1a, where the shaft of the driving means 104 will connect to enter in rotation the pumping and foaming unit 102 of the device 100.

The pumping and foaming unit 102 preferably comprises a pumping element 110 and a foaming element 120, both driven by a single driving means 104: typically, the pumping element 110 and the foaming element 120 are both driven in rotation by a same single shaft 130 connected to both, as shown in FIG. 1b. The shaft 130 is entrained in rotation by a single motor. The pumping element 110 is typically configured as gears (gear elements) that, when rotating at high speed, pumps/sucks fluid or food product through the fluid inlet 21 and air through the air entry 30 throughout their teeth so that pumping and mixing is achieved and also a pre-foaming of the mixture is obtained.

The module (i.e. the size), the number and the height of the teeth configuring the gears in the pumping element 110 need to be carefully chosen, together with the shape and size of the foaming element 120, so as to have a good balance between the pumping performance of the pumping element 110 and the foaming capability of the foaming element 120 (i.e. so as to obtain the desired balance of pumping and foaming in the device 100 of the invention). Typically, a too efficient pumping would result in bad quality foam.

From the pumping element 110, the mixed and also slightly foamed mixture of fluid and air is then conveyed into the foaming element 120. The foaming element 120 in the device 100 of the invention comprises a rotatable part with respect to another part, preferably static, such that a small gap is created between the two: the fluid or food product mixed with air and coming from the pumping element 110 goes into this gap where it is subjected to high shear stress forces which make the mixture foam by Couette Flow effect.

From the foaming element 120, the foamed mixture enters typically in the heating unit 103, as represented in FIG. 1b: according to the invention, either cold foam can be provided (thus, the heating unit 103 will not be activated) or hot foam is provided instead when the heating unit 103 is activated. Preferably, the heating unit 103 comprises a heating path 140 with a serpentine or labyrinth shape allowing sufficient time and contact area for the mixture to be heated, and a heating plate 150 heating by contact the path where the mixture flows. The electrical connection 23 in the device 100 allows heating of the heating plate 150. Other executions of the heating unit 103 are also possible according to the invention.

Typically, the fluid processed in the device 100 of the invention is preferably a food or beverage liquid, particularly a foamable liquid such as milk, though any kind of foamable fluid can be used, such as cream, yoghurt, ice-cream liquid mix, non-dairy products or mixes, etc. Also, other foamable food products, such as vegetable foams, sauces, liquid purées, etc. can be foamed with the device of the present invention, which can also comprise food pieces.

Preferably, the foaming element 120 and the pumping element 110 rotate (entrained by the same driving means 104 and connected through the shaft 130) rotate at high speed, typically comprised between 2000 and 10000 rpm, preferably between 4000 and 8000 rpm.

Figure 2:
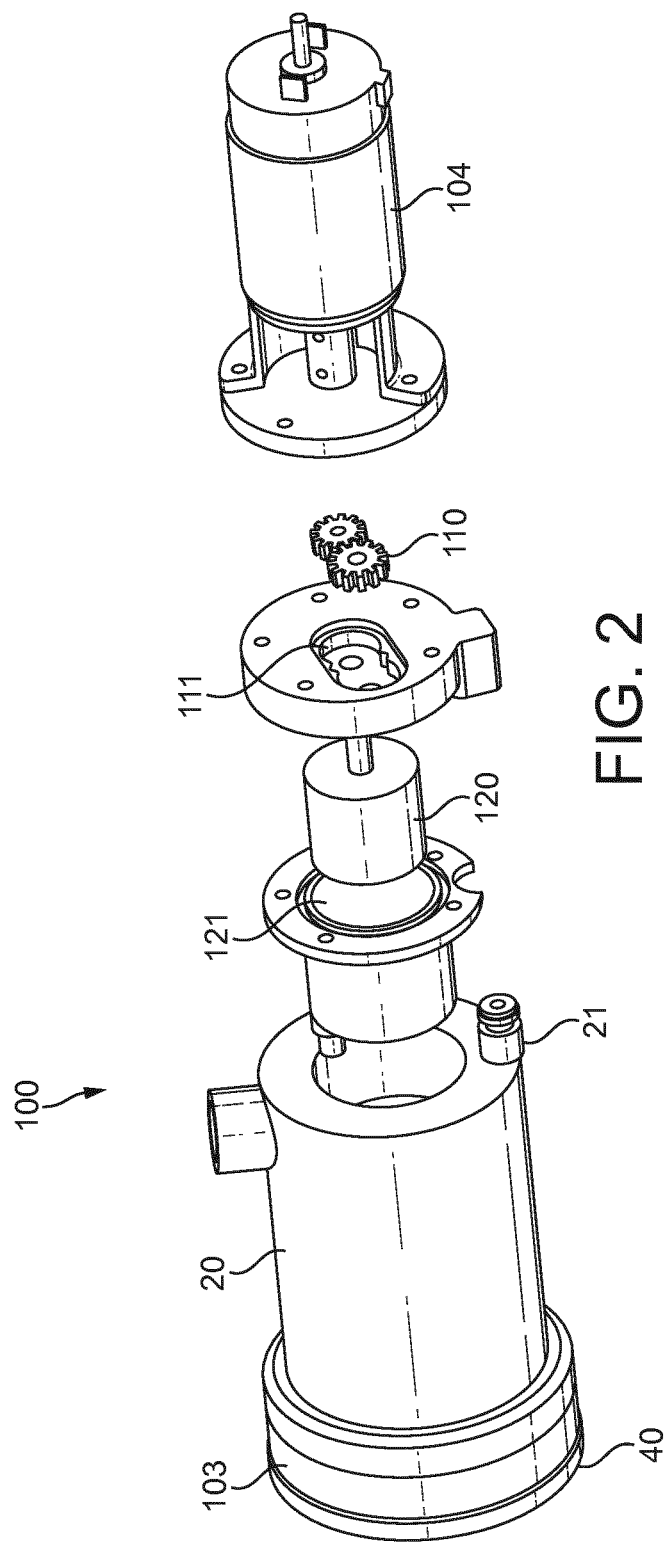
FIG. 2 shows a schematic view of the components of a pumping and foaming device according to a second preferred embodiment of the present invention.

Another possible embodiment of the pumping and foaming device 100 of the invention is represented in FIG. 2, where a single driving means 104 (typically, a motor) entrain in rotation both the pumping element 110 and the foaming element 120 of the pumping and foaming unit 102. The rotation of the pumping element 110 (typically configured as gears) sucks/pumps air and fluid (or food product) in the pumping chamber 111 where they are mixed and later conveyed into the foaming chamber 121 where they are subjected to high shear stress by the rotation of the foaming element 120 (typically configured as a cylinder) with respect to a static outer wall. Once foamed, the mixture flows into the heating unit 103 where it is optionally heated before being delivered through the foam outlet 40.

Figure 3:
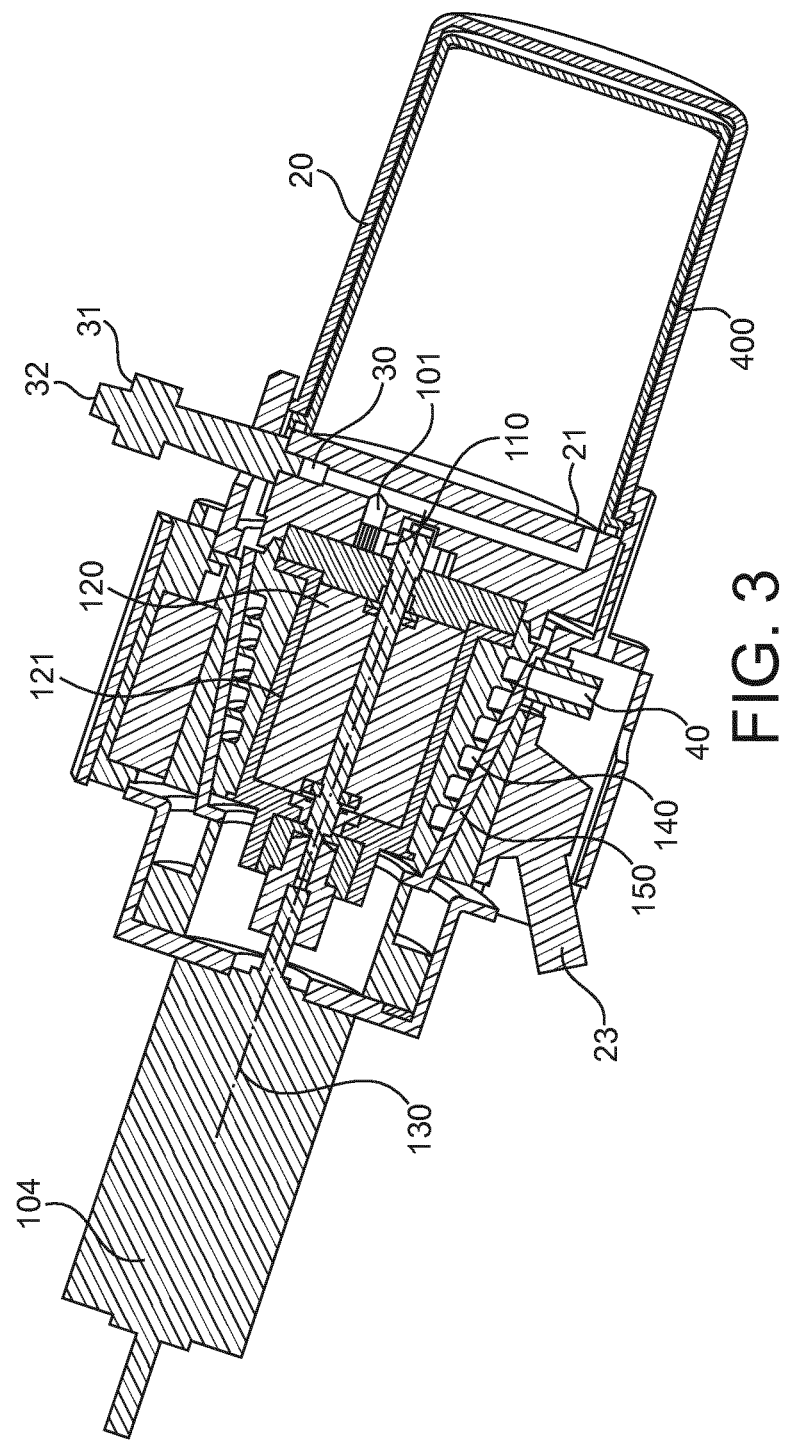
FIG. 3 shows a sectional view of a pumping and foaming device according to a third preferred embodiment of the present invention.

Another possible embodiment of the pumping and foaming device 100 of the invention is represented in FIG. 3. The driving means 104 drive a shaft 130 that moves both the foaming element 120 (here configured as a cylinder) and the pumping element 110 (configured as gears). The rotation of the gears (pumping element 110) sucks both air in the air entry 30 and fluid from the fluid inlet 21, both fluid and air being pre-mixed in the mixing unit 101 and then passing into the pumping element 110. Typically, the external air inlet 32 is regulated by means of a valve 31. The foaming element 120 configures a foaming chamber 121 where the mixture of fluid and air is foamed by Couette Flow and can also be optionally heated when it circulates through a heating path 140 heated by a heating plate 150 (power comes from the electrical connection 23) before being delivered to cup by the foam outlet 40. In this configuration, the fluid is stored in a cartridge 400, preferably a disposable cartridge, which is arranged inside a container 20 within the pumping and foaming device 100 of the invention. Other configurations are also possible. The main idea is that the parts which are in contact with the fluid (typically milk or a food product) can be easily detached and cleaned or are made disposable (as the container 400 in FIG. 3). The embodiments shown in FIGS. 2 and 3 are preferred embodiments for a device 100 that is portable.

Figure 4A:
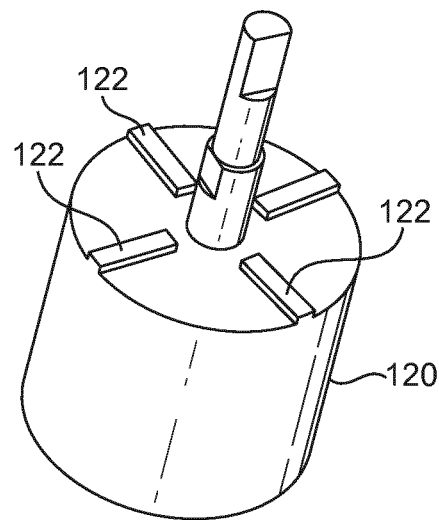
FIGS. 4a-b show different possible configurations of the foaming unit in a pumping and foaming device according to the present invention.
Figure 4B:
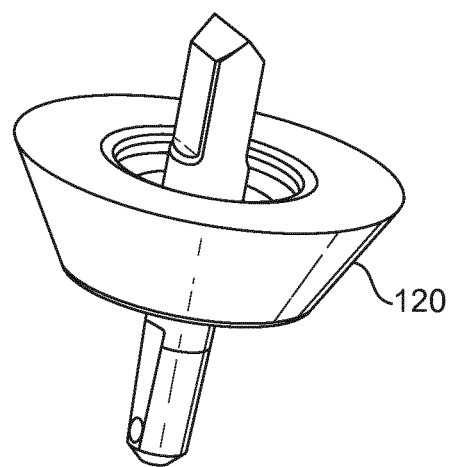

As shown in FIG. 4a or 4b, there are different possible executions of the foaming element 120 in the device 100 of the invention, such as a cylinder configuration (FIG. 4a), a cone (FIG. 4b) or a disc (not shown). The cylinder in FIG. 4a comprises one or a plurality of propelling elements 122 intended to evacuate pieces of food that may have a bigger size and may be blocked in the foaming chamber 121: with the help of these propelling elements 122, any food part that may be retained in the lower part of the foaming element 120 will be sent to the gap formed between by the foaming element 120 and the inner walls of the foaming chamber 121, where foaming by Couette Flow takes place. The cone configuration as shown in FIG. 4b is particularly advantageous for an easy cleaning of the foaming element and the foaming chamber.

Figure 5:
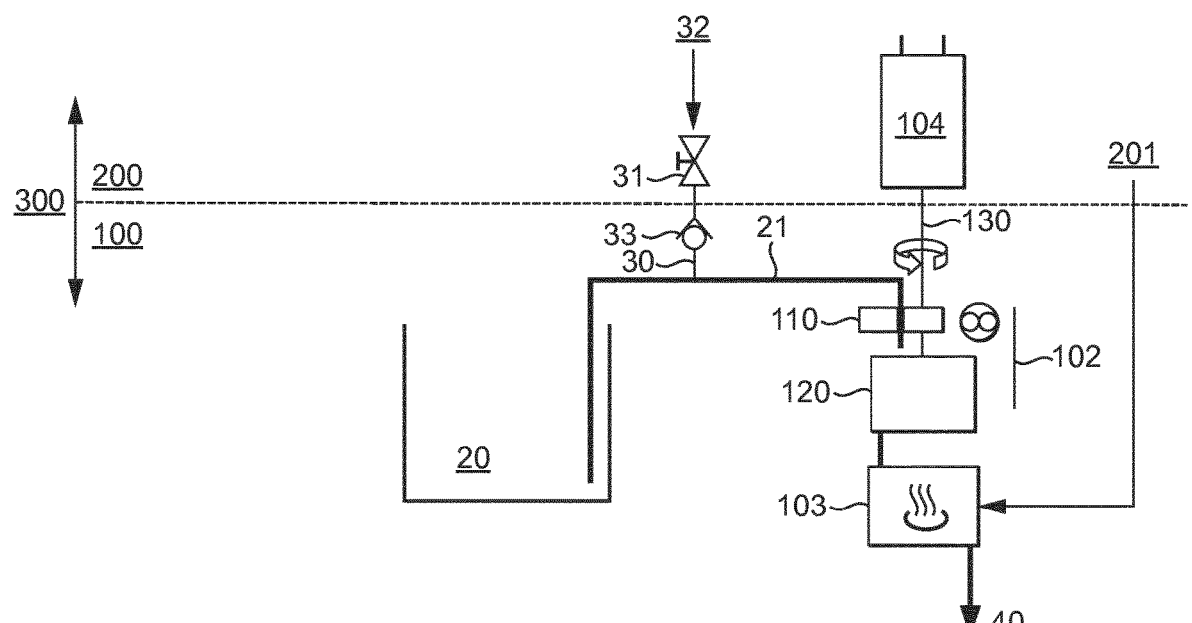
FIG. 5 shows a schematic functional view of a complete system comprising a pumping and foaming device according to the present invention.

FIG. 5 shows functionally the pumping and foaming device 100 of the invention connected to a machine 200; both together, machine 200 and device 100 configuring a system 300. The machine 200 comprises driving means 104 entraining in rotation the pumping element 110 and the foaming element 120. The machine 200 further comprises an external air inlet 32 connected to the air entry 30 in the device 100, preferably through an adjustable valve 31 regulating the amount of air injected in the device 100 and also preferably through a back-pumping valve 33 preventing any back-pumping of fluid from the container 20 towards the external air inlet 32. The machine 200 further comprising a heat source 201 to heat the heating unit 103 of the device 100. The system 300 can also be entirely integrated in an accessory with detachable and cleanable parts (embodiments shown in FIGS. 2 and 3).

Optionally, the machine 200 can also comprise control means (not shown) which will manage and control the foaming process parameters in the pumping and foaming device 100. As an alternative, it is also possible that the machine 200 comprises no control means 36, meaning that the user will then adjust manually part or all of the parameters of the foaming process in the pumping and foaming device 100.

The type of foam obtained from a fluid primary depends on the type of fluid which is foamed. When foaming milk, for example, the type of foam obtained varies depending on the type of milk used, such as raw whole milk, pasteurized homogenized full-cream milk, pasteurized skim milk, UHT homogenized full-cream milk, UHT skim milk, etc. For a given type of milk, leaving apart the processing conditions used during its manufacture, foaming properties are largely determined by the temperature at which milk is foamed and by its fat and protein content.

On the other hand, the quality of fluid foam is determined by foam properties, such as: quantity and size of the air bubbles formed in the fluid structure once foamed; foam stability, defined as the amount of foam which is stable, i.e., which substantially keeps its volume, usually expressed as the time required for 50% of the fluid to drain from the foam (the time required for reaching a 50% reduction in the foam volume), and foaming level defined as the ratio of the volume of fluid entering the device 100 with respect to the volume of foam provided by the foam outlet 40 (also known as foam overrun, which is defined as the increase in volume in a certain initial volume of fluid by the effect of foaming).

Therefore, for a given type of fluid (i.e., the fat and protein content and the processing conditions during the fluid manufacture are fixed values), the properties of the foam obtained (quantity/size of bubbles, stability and overrun) for this fluid will be determined by the foaming process carried out in the pumping and foaming device 100 of the invention, specifically by the process parameters detailed as follows.

Fluid flow rate passing from the container 20 into the device 100 which depends on the rotational speed of the pumping and foaming unit 102 and on the diameter of the fluid inlet 21 providing fluid from the container 20.

Amount of air coming through the air entry 30, also depending on the rotational speed of the pumping element 110 and on the regulation of the adjustable valve 31.

The pumping and foaming device 100 can also comprise a code, typically a bar code, comprising the information of process parameters, which is provided to the control means in the machine 200 to carry out the foaming process in an optimal way.

In the Couette flow effect carried out in the foaming element 120, the shear stress experienced by the mixture of fluid and air depends largely on the width of the gap formed between the external surface of the foaming element 120 and the inner walls of the foaming chamber 121: this width is chosen depending on the type of foamable fluid or foamable food product in the container 20 which is to be foamed, chosen in such a way that optimal foaming effect by shear (Couette flow) is obtained. Typically, the width of the gap is larger as more viscous the fluid or food to be foamed is: for example, milk would require a smaller gap than liquid yogurt and these last a smaller gap than foamable food products. Typically, the width of the gap for milk is around 0.3 mm and the width for liquid yogurt and for foamable food products is bigger.

The pumping and foaming device 100 of the invention is advantageously configured as cleanable, cleaning being able to be made in a very easy way, as it will be further explained. As shown in FIGS. 1a-b, the container 20 can be separated from the rest of the device for its easy cleaning. Moreover, the heating unit 103 can be also separated and unfolded allowing its inner cleaning, particularly of the heating path 140 and of the heating plate 150. The pumping element 110 (gears) and the foaming element 120 (cylinder, cone, disc or the like) can also be separated from the rest of the device 100 in order to be cleaned. As previously explained, the foam outlet 40 can be detached and cleaned separately. As previously explained, no other parts are in contact with foamable fluid or food that need to be cleaned for hygienic reasons, as the foam goes directly into cup.

Typically, the pumping and foaming device 100 allows a plurality of pumping and foaming operations until the container 20 has been emptied of fluid or food. Between the different foaming applications carried out, the container 20 is preferably conserved in a proper conservation area, typically in a refrigerator, in order to keep the fluid or food in a proper hygienic condition.

The device of the invention is able to provide superior quality foam on demand: micro foam will be delivered, with a higher quality to the foam currently on the market, with adjustable foam texture and thickness, such that the foam delivery will have quick and stable foam settling. Furthermore, the device of the invention is compact, needing very limited equipment on the machine side, easy to use on the part of the user and clean, as no fluid comes in contact with the machine. Also, the foam provided by the device can be either hot or cold, and will have very high stability. Even more, the device provides repeatability of the foam obtained, such that the same foam can be essentially obtained from one beverage to the other, thanks to the fact that the process carried out in the device is controlled by acting on limited and stable parameters, thus providing high reliability of results.

In summary, some of the main advantages of the device of the invention are:
Superior micro foam being delivered
Adjustable foam density, by acting on the air entry and optionally on the adjustable air valve
Simple architecture (only one motor to drive the pumping and foaming axis)
In-line system, direct to cup
Embodiments allowing a very easy cleaning
Variety of foamable products to be foamed (from fluid to food liquid products)

Although the present invention has been described with reference to preferred embodiments thereof, many modifications and alterations may be made by a person having ordinary skill in the art without departing from the scope of this invention which is defined by the appended claims.

The invention claimed is:

1. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device, and the system further comprises an adjustable valve configured for regulating an amount of the air entering the pumping and foaming device.

2. The system according to claim 1 comprising a heat source configured to heat the foam coming from the pumping and foaming unit before the foam is delivered.

3. The system according to claim 1, wherein the foaming element comprises a rotatable element, and the rotatable element and a stationary part in the foaming chamber define a gap where the mixture of the air and the fluid is driven under the shear stress to foam the mixture.

4. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device,
    wherein the foaming element comprises a rotatable element, and the rotatable element and a stationary part in the foaming chamber define a gap where the mixture of the air and the fluid is driven under the shear stress to foam the mixture, wherein the gap in the foaming chamber is between 0.2 mm and 1 mm.

5. The system according to claim 1, wherein the pumping element comprises gears.

6. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device,
    the system comprising a motor configured to drive the pumping and foaming unit such that the pumping element and the foaming element rotate around the shaft at a speed between 2,000 rpm and 10,000 rpm.

7. The system according to claim 1, wherein the foaming element has a shape selected from the group consisting of a cylinder, a cone and a disc.

8. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device,
    wherein the foaming element comprises at least one extension extending from at least one surface of the foaming element, the at least one extension configured to direct the fluid towards the foaming chamber.

9. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device,
    the system comprising a component selected from the group consisting of a container, a cartridge, and a combination thereof, wherein the component is configured for the fluid to be pumped through the component, and the component comprises an air entry through which the air is pumped to mix with the fluid.

10. A system for providing a fluid foam on demand, the system comprising a pumping and foaming device comprising a pumping and foaming unit rotatable around a shaft by a driver, the pumping and foaming unit comprising a pumping element configured for rotation that pumps both air and fluid and mixes the air with the fluid to form a mixture; the pumping and foaming unit further comprising a foaming element configured for relative rotation in a foaming chamber to drive the mixture of the air and the fluid from the pumping element under a certain level of shear stress which foams the mixture, the system further comprises a driving member configured for driving in rotation the pumping and foaming unit, and the system further comprises an external air inlet through which the air enters the pumping and foaming device,
    the system comprising a back-pumping valve connected to the air inlet and configured for preventing back-pumping of the fluid.

* * * * *